United States Patent [19]

Morgan et al.

[11] 4,263,991
[45] Apr. 28, 1981

[54] COMBINED FAILSAFE AND SERVICE BRAKE

[75] Inventors: George H. Morgan, South Bend, Ind.; Charles A. Kreitner, Benton Harbor, Mich.

[73] Assignee: Lambert Brake Company, St. Joseph, Mich.

[21] Appl. No.: 801,085

[22] Filed: May 27, 1977

[51] Int. Cl.³ .............................................. F16D 65/24
[52] U.S. Cl. .................................. 188/170; 188/72.3
[58] Field of Search ..................... 188/71.5, 72.3, 170, 188/171

[56] References Cited

U.S. PATENT DOCUMENTS

| | | | |
|---|---|---|---|
| 2,342,750 | 2/1944 | Newell | 188/170 X |
| 3,082,647 | 3/1963 | Banker | 188/170 X |
| 3,547,234 | 12/1970 | Cummins et al. | 188/170 |
| 3,680,666 | 8/1972 | Sommer | 188/170 |
| 3,863,038 | 1/1975 | Kreitner et al. | 188/170 |

*Primary Examiner*—Duane A. Reger
*Attorney, Agent, or Firm*—Trexler, Wolters, Bushnell & Fosse, Ltd.

[57] ABSTRACT

A hydraulic or fluid-power brake is disclosed. The brake comprises a stationary housing, and a rotor shaft journaled in the housing. A number of rotor discs are carried on the shaft for rotation therewith, but they are adapted for axial sliding motion on the shaft, as by a spline arrangement. A number of stator discs are interleaved with the rotor discs and are carried on torque pins mounted in the housing for sliding motion in the direction of the rotor shaft axis, but are secured against rotational movement with the rotor shaft and rotor discs. Biasing means such as springs urge the stator discs into braking engagement with the rotor discs. To relieve this braking action and permit free shaft rotation, a primary piston, having an annular skirt surrounding the rotor discs, engages one stator disc to apply a force urging that stator disc in a direction opposite to the force applied by the biasing means so as to release the braking action. A secondary device is included for opposing the primary piston action so as to permit the biasing means to urge the stator discs into braking engagement with the rotor discs. This secondary means can be independently energized, by fluid pressure or mechanical means as by a service brake. In one embodiment, this secondary means includes a piston carried in an annular cylinder chamber; the piston is located to apply an annular force against the stator disc in opposition to the force applied by the primary piston.

19 Claims, 7 Drawing Figures

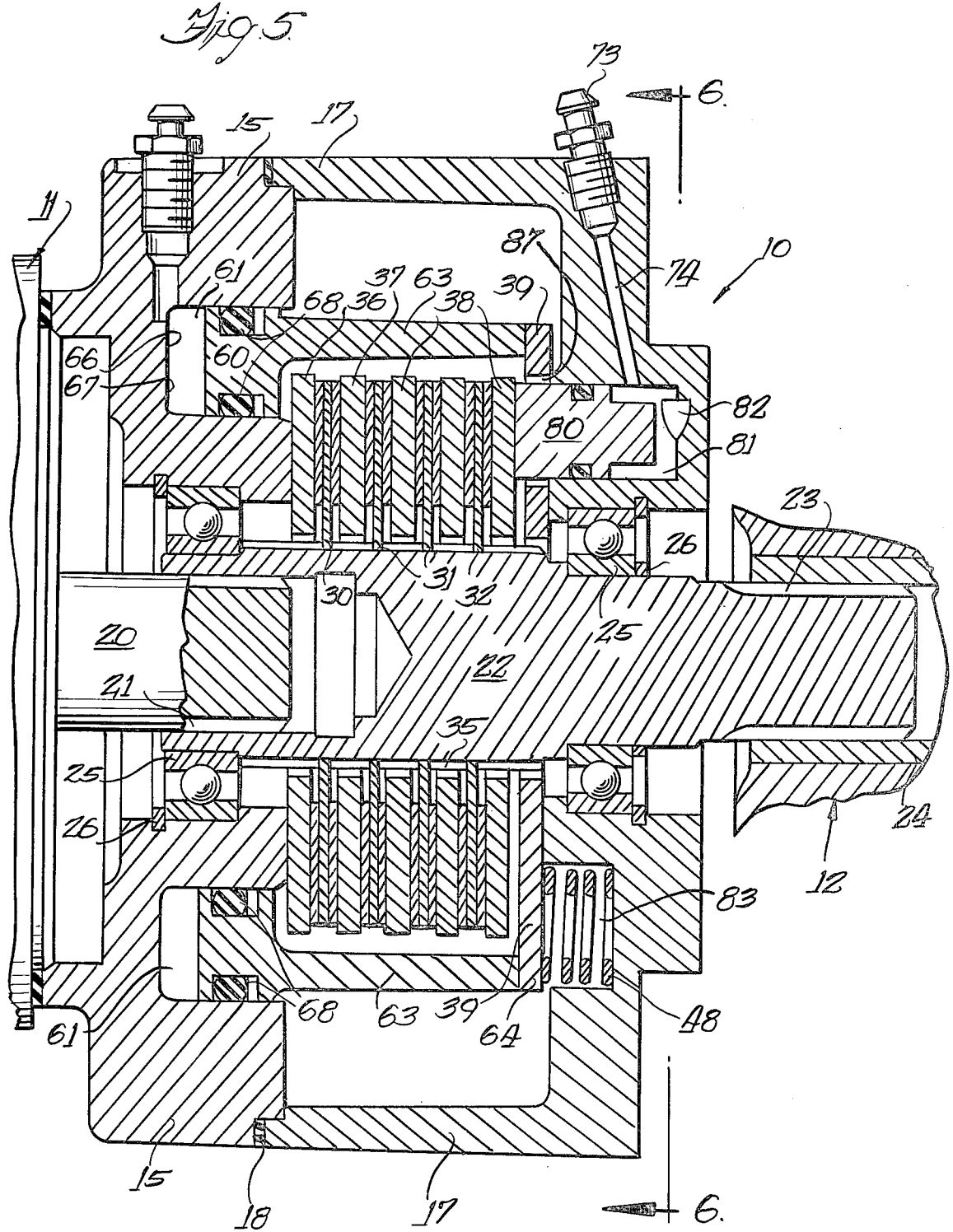

COMBINED FAILSAFE AND SERVICE BRAKE

BACKGROUND OF THE INVENTION

This invention relates generally to hydraulic brakes, and more particularly concerns a hydraulic brake having provision for accommodating a service brake actuator in combination with a primary brake actuator.

In hydraulically driven power trains, hydraulic brakes are commonly used to control the rotating speed of shafts and associated parts. For example, such power trains can include a hydraulic motor which turns a shaft connected to a speed reducer. A hydraulic brake, interposed between the motor and the speed reducer, can be used to control shaft speed and to quickly halt shaft rotation when hydraulic power train operation is no longer desired.

In such applications, these brakes can provide a powerful motion-retarding force, are relatively compact, and can be provided at relatively low cost.

In many applications, it is important that the brake be of the failsafe variety, i.e., that the brake be designed so that a braking force is applied should a failure occur in the hydraulic system. One such brake which has met with considerable commercial success is that disclosed and claimed in U.S. Pat. No. 3,863,038.

It is the general object of the present invention to provide a hydraulic failsafe brake which accommodates and utilizes a service brake actuator as well as a primary braking system actuator. A related object is to provide such a brake which permits application or energization of the service brake without effectively disturbing other portion of the braking system and the hydraulic pressures present therein.

Another object is to provide a hydraulic brake of the failsafe variety in which a second fluid pressure system can be provided for controlling action of the primary fluid system and the consequent braking action. A related object is to provide such a secondary braking system in a design which maintains the failsafe character of the brake.

Yet another object of the invention is to provide a hydraulic brake of the type described which permits braking action to be smoothly and precisely applied.

Yet another object is to provide such a brake which is compact in size, yet reliable and rugged in design, and which can be offered at an attractive commercial cost.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 5 is a sectional view taken substantially in the plane of line 5—5 in FIG. 4;

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention.

Figure 1:
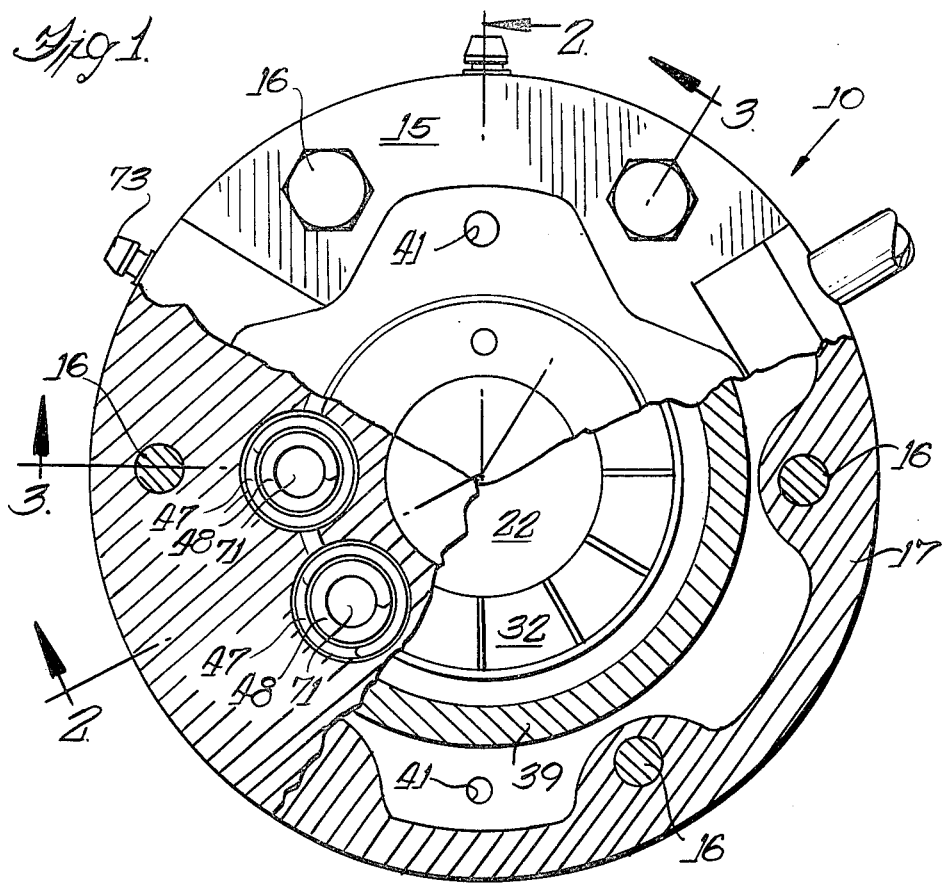
FIG. 1 is an end view of a hydraulic brake embodying the present invention, portions of the brake being cut away to show details of the device.
Figure 2:
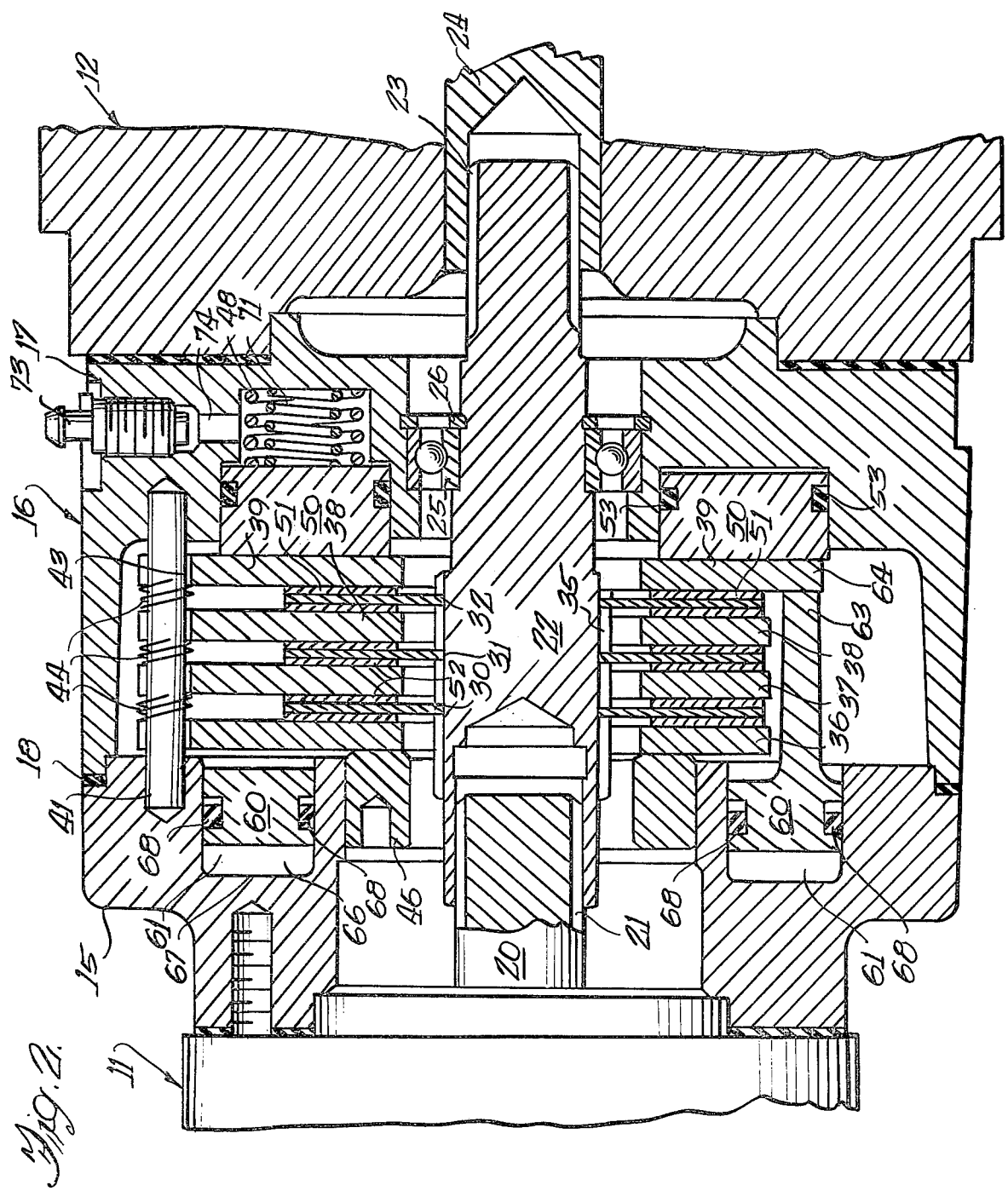
FIG. 2 is a sectional view taken substantially in the planes of line 2—2 in FIG. 1.
Figure 3:
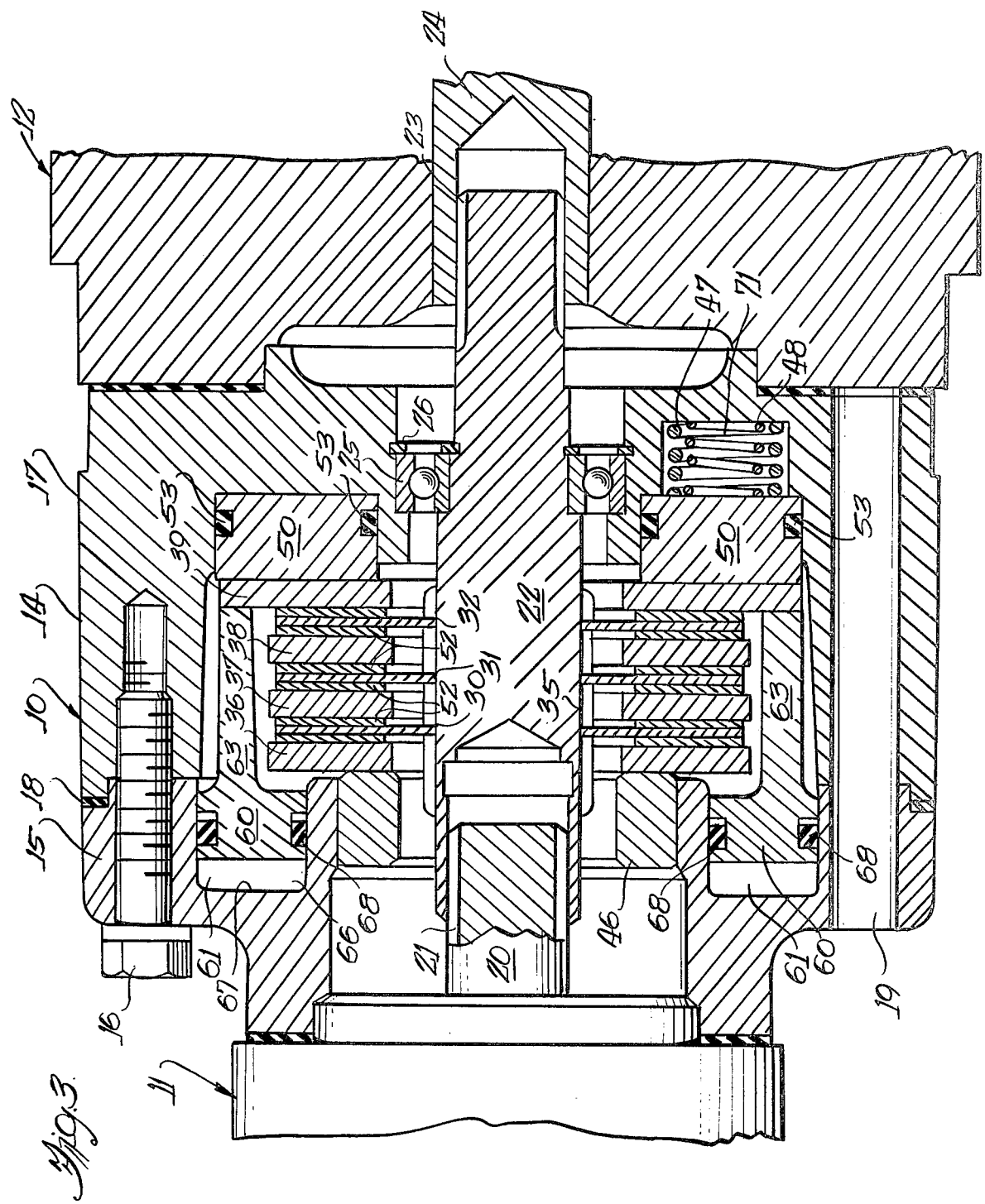
FIG. 3 is a sectional view taken substantially in the planes of line 3—3 in FIG. 1.

Turning first to FIGS. 1-3 inclusive, a hydraulic brake unit 10 is shown interposed between a hydraulic driving motor 11 and a driven unit such as a gear box 12. The brake 10 includes a housing 14 which here comprises a front or power plate 15 secured, as by bolts 16 to a second housing member 17. To prevent fluid leakage from the housing, an appropriate seal 18 is interposed between the power plate 15 and the second housing member 17. A bolt bore 19 permits the unit 10 to be secured to the gear box 12, if desired.

To transfer power from the driving motor 11 to the driven unit 12, the motor 11 has an output shaft 20 which is connected, as by a key or spline arrangement 21, to an intermediate or rotor shaft 22 carried within the brake unit 10. At an opposite end of the rotor shaft 22, a second key or spline connection 23 connects the rotor shaft 22 to a receiving shaft 24 carried within the driven unit 12. An appropriate bearing 25 is mounted centrally of the second housing member 17 to journal the rotor shaft 22 for free rotation. This bearing 25 is secured in its illustrated position by a snap ring 26 or other convenient device.

Carried on the rotor shaft 22 are a plurality of rotors 30, 31 and 32. These three rotors are mounted to turn with the rotor shaft 22, but they are free to slide axially along the rotor shaft 22. Here, the mounting permitting this axial sliding takes the form of a spline arrangement 35.

Interleaved between the rotors 30-32 inclusive are four stator discs 36-39, inclusive. These discs are secured against rotation relative to the housing 14, yet are mounted for limited axial motion within the housing. To this end, torque pins 41 extend between the housing members 15 and 17 and are fitted through apertures 43 formed in the stator discs 36-39. Small springs 44 or other biasing devices can also be mounted on the torque pins 41 between the stator discs 36-39 to encourage stator disc loosening action and proper rotor-stator disc spacing when the rotor disc 22 and splined rotors 30-32 are freely turning. Axial adjustment of the stator and rotor discs is accomplished through an annular adjusting nut 46.

As indicated above, this brake embodies a failsafe design. To this end, biasing devices such as internested springs 47 and 48 act to force the stator discs 36-39 against the rotor discs 30-32 and provide a consequent braking action within the unit. As illustrated in FIGS. 2 and 3, these brake springs 47 and 48 can act through an intermediate secondary piston 50, which can be of annular shape as indicated to engage the stator disc over a relatively large annular surface. When the springs 47 and 48 urge the secondary piston 50 to the left (in FIGS. 2 and 3) the piston 50 engages an adjacent primary stator disc 39, and urges it into engagement with the adjacent rotor disc 32 through an intermediate brake pad 51. As the piston 50, primary stator disc 39 and engaged adjacent rotor disc 32 slide axially to the left, the other stator discs 36-39 complete engagement with the associated rotor discs 30-32 against the action of the separating spring members 44. Piston seals 53 prevent fluid leakage past the piston 50.

Since the springs 47 and 48 are compressed during brake assembly, they consequently constantly apply their brake-engaging pressure against the piston 50 and the rotor and stator discs. In view of this failsafe design, a positively-acting brake release mechanism is necessary to permit rotation of the rotary shaft 22. Here, this positive brake release is accomplished by an annular primary piston 60 carried for sliding motion generally parallel with the axis of the shaft 22 in an annular cylinder 61 formed in the power plate 15. An annular skirt 63 depends from the piston 60 and engages extension portions 64 of the primary stator disc 39. As hydraulic fluid pressurizes a chamber 66 formed within the annular cylinder 61 between the cylinder head top 67 and the piston 60, the piston 60 is forced outwardly, or to the right as shown in FIGS. 2 and 3. This piston movement causes the annular skirt 63 to engage the stator disc 39 and force the stator disc 39 to the right as well, thereby relieving pressure on the other stator discs 36-38 and consequently releasing the braking pressure against the rotors 30-32 as described above. When the braking action is desired, hydraulic pressure in the chamber 61 is relieved, thereby permitting the piston 60 to move to the left and allowing the springs 47 and 48 to apply braking action pressure against the primary stator disc 39. Seals 68 prevent fluid leakage past the piston 60.

In accordance with the invention, this brake can accommodate a service brake. To this end, one or more secondary hydraulic chambers 71 are defined in the housing member 17. Here, in the interests of economy, these chambers are formed as recesses for additionally carrying the actuating springs 47 and 48, and are interconnected to a hydraulic fluid inlet 73 by appropriate passages 74. Actuation of a hydraulic source 75 (FIG. 7) causes fluid to flow through the inlet 73 and into the secondary chamber 71. This inflow of hydraulic fluid forces the secondary piston 50 to the left as shown in FIGS. 2 and 3, and causes the stators 36-39 to engage the associated rotors 30-32 and consequently apply braking action. Upon release of the pressure in the secondary chamber 71, continued pressure in the primary chamber 61 will, of course, again permit the rotors 30-32 to free themselves from braking action with the associated stators 36-39.

It will be understood that this secondary hydraulic chamber 71 here takes the form of an annular chamber passing entirely around the rotor shaft 22. Alternatively, the secondary piston 50 can be a spot piston adapted to engage preselected spots upon the primary disc 39. If desired, three such pistons 50 can be located at 120° of rotation about the rotor shaft 22, provide even, uniform, smooth braking and brake release action. In such an embodiment, the secondary chamber 71 can take the form of a series of angularly spaced apart individual spot chambers which receive hydraulic fluid from interconnector passages 74. The connection 73 and the passages 74 here comprise a second fluid path connecting the secondary piston 50 to the source 75 of fluid pressure.

It also will be understood that, while the biasing springs 47 and 48 are here illustrated as interposed between the secondary piston 50 and a housing member 17, the annular piston 50 could be carried within a hydraulic chamber or cylinder formed within the housing member 17, and the biasing springs could be carried in retaining wells suitably formed within the piston 50 itself. Moreover, these springs can be effectively interposed between the piston 50 and the housing 17 as illustrated, or, alternatively, could be interposed between the piston 50 and the adjacent primary stator disc 39.

Figure 4:
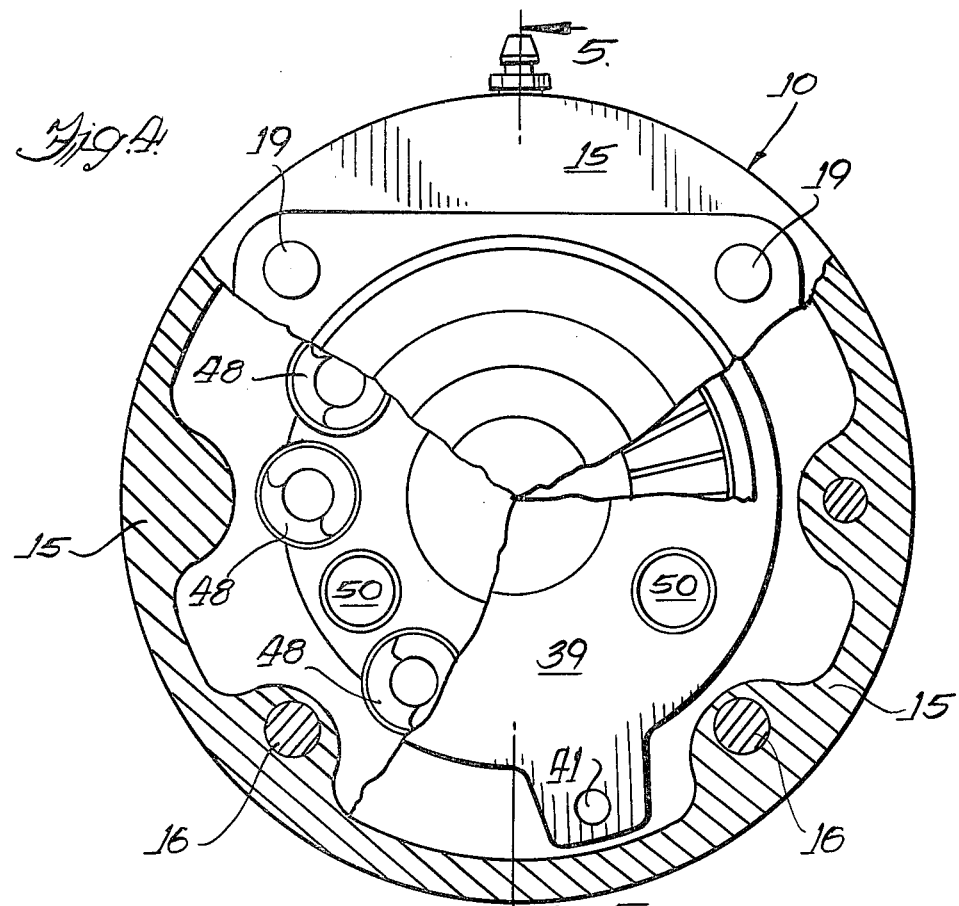
FIG. 4 is an end view of an alternate embodiment of the invention similar to FIG. 1, portions again being broken away to show further details of the device.
Figure 6:
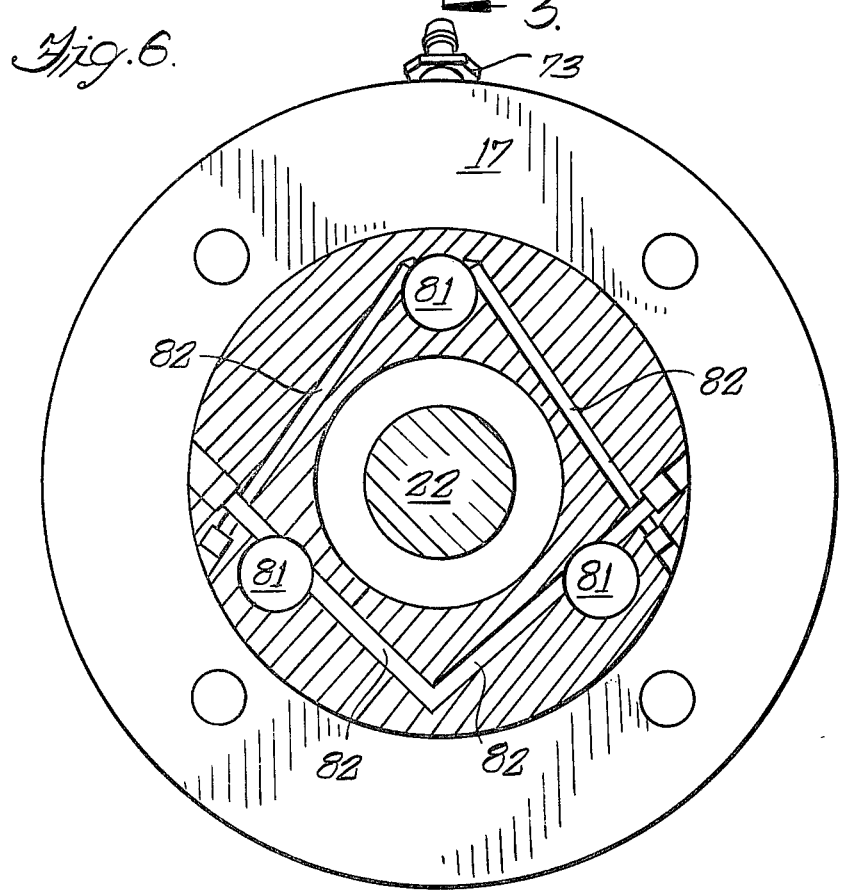
FIG. 6 is a sectional view taken substantially in the plane of line 6—6 in FIG. 5.

A slightly modified version of the invention is illustrated in FIGS. 4-6 inclusive. In this embodiment, a series of spot pistons 80 are carried in appropriate chambers 81 for motion toward and away from the stators. These pistons 80 can be carried in an array conveniently interspersed between the biasing springs 48 carried in chambers or recesses 83. As described above, when the secondary system is hydraulically energized and fluid pressure is applied through a secondary fitting 73 from a hydraulic source 75 fluid pressure is incresed in the passages 74, additional passages 82, and in the chambers 81 so as to force the pistons 80 to the left as shown in FIG. 5.

In accordance with another aspect of the invention, however, the braking action applied by these pistons 80 is not applied in direct opposition to the primary piston 60 against the primary disc stator disc 39. Rather, the pistons 80 extend through apertures 87 formed in the primary disc 39, and act against an adjacent secondary stator disc 38. Thus, increases in hydraulic pressure in the secondary system passages 74 and chamber 81 and consequent movement of the piston 80 do not require corresponding movement of the primary piston 60 and consequent pressure changes in the chambers 61.

Figure 7:
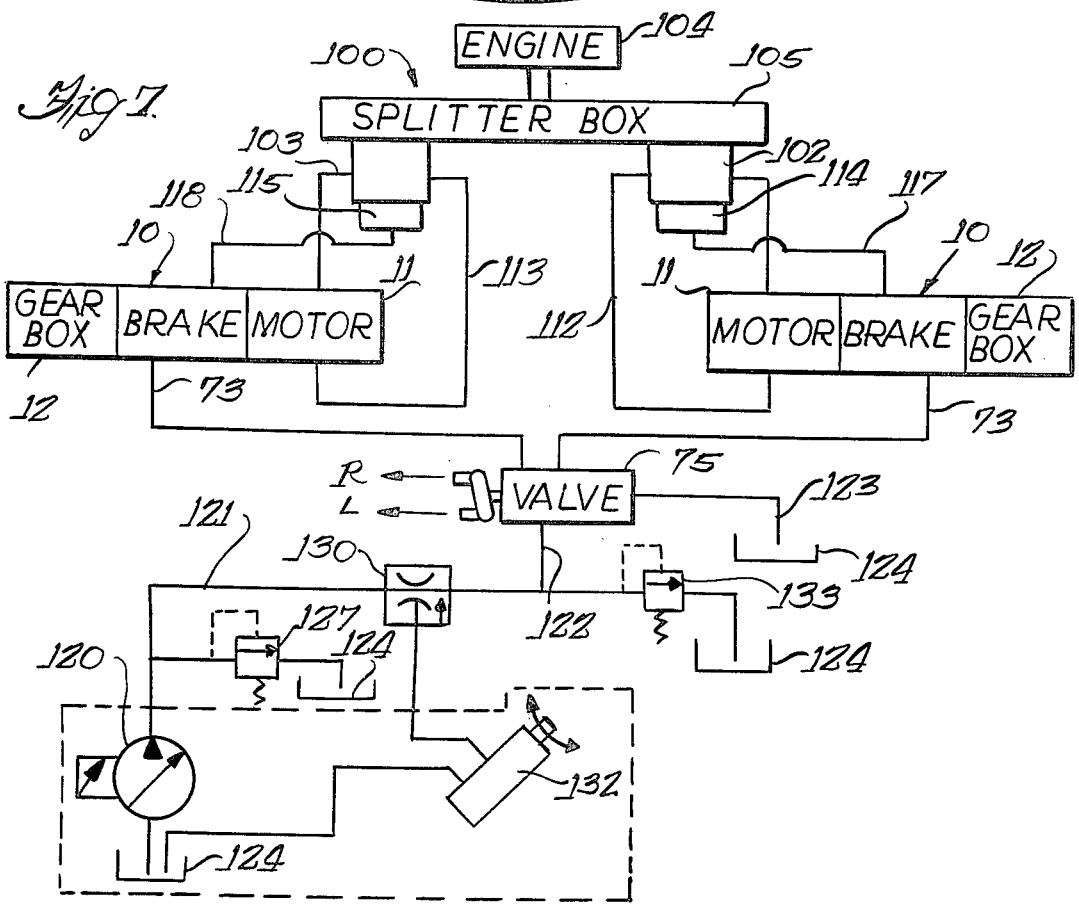
FIG. 7 is a diagram, in schematic form, showing a novel hydraulic system which can be used with the novel brake.

A hydraulic circuit 100 which can be used with the brake is schematically illustrated in FIG. 7. Here, two sets of gear boxes 11, brakes 10 and hydraulic motors 12 are coupled in two separate drive trains to provide two independent drive and braking capabilities. This arrangement can be offered to provide independent control of the left and right sides of a vehicle, or in other arrangements.

In this embodiment, two variable displacement pumps 102, 103 are driven by a single prime mover or engine 104 through a power transmission such as a splitter box 105. Each variable displacement pump 102, 103 energizes an associated motor 12 through hydraulic circuitry 112, 113. Ech pump 102, 103 also drives a charge pump 114, 115, and these pumps, in turn, pressurize lines 117 and 118 to charge the associated brakes 10 in the failsafe manner described above.

Service operation for both the brake units is provided through a source 75 of fluid pressure such as a power brake valve. To independently operate two brake units 10, the valve 75 can be of the type found in U.S. Pat. Nos. 3,827,765 and 3,900,229. For example, a left-turn pulling force L can be made to apply braking action to a vehicle left side, and a right-hand turn can be directed by right side braking action caused by a right turning force R.

Under normal circumstances, fluid flows continuously through the valve 75 from a pressurizing pump 120 (operated independently of the pumps 114 and 115) through delivery lines 121 and 122, an exhaust line 123 and, ultimately, into a reservoir 124. A relief valve 127 limits maximum pressure delivered to downstream portions of the system.

A flow divider 130 insures that fluid pressures and quantities sufficient to operate the brake 10 before other portions of the system, such as a power-assisted steering unit 132, is energized. Over-charging is prohibited by a relief valve 133. In this way, smooth, easily controlled yet failsafe-design braking action can be offered.

The invention is claimed as follows:

1. A fluid brake comprising a stationary housing, a rotor shaft rotatable in said housing, at least one rotor disc carried on the rotor shaft for rotation therewith but the disc being adapted for axial sliding motion movement on the shaft, at least one stator disc located adjacent the rotor disc and connected to the housing for axial, non-rotational movement relative to the rotor shaft, biasing means in said housing for urging the stator disc into braking engagement with the rotor disc, a primary piston reciprocable in the housing and having an annular skirt surrounding the rotor disc and engaging the stator disc to apply a force urging the stator disc in a direction opposite to the force applied by the biasing means to release the rotor-stator braking action, and secondary piston means reciprocable in the housing but movable independently of the primary piston for selectively opposing the primary piston action, and the primary piston force so as to selectively permit the biasing means to urge a stator disc into engagement with a rotor disc to provide the braking action.

2. A fluid power brake comprising a stationary housing, rotor shaft means rotatable within said housing, a plurality of rotor discs carried on the shaft means for rotation therewith but being adapted for axial sliding movement thereon, a plurality of stator discs interleaved with the rotor discs and connected to the housing for axial, non-rotational movement relative to the rotor shaft, biasing means in said housing for urging the stator discs in a given direction into engagement with adjacent rotor discs to provide a braking action, primary piston means reciprocable in the housing and located to engage at least one stator disc and urge that stator disc in a direction opposite to the direction in which the stator disc is urged by the biasing means, whereby to relieve the biasing and braking action on the stator discs, and secondary piston means reciprocable in the housing but movable independently of the primary piston for selectively opposing the action of the primary piston means and primary piston force so as to selectively urge a stator disc into engagement with the adjacent rotor discs to provide braking action.

3. A brake according to claim 2 including first fluid path means connecting the primary piston to a primary source of fluid pressure, a selectively actuatable secondary pressure source, second fluid path means connecting the secondary piston to the secondary pressure source, actuation of the secondary pressure source thereby actuating the secondary piston means and consequently providing braking action.

4. A brake according to claim 3 wherein said secondary fluid pressure source comprises a service brake actuator actuatable independently of the primary fluid pressure source.

5. A brake according to claim 2 wherein said biasing means is interposed between said secondary piston and one of said stator discs.

6. A brake according to claim 2 wherein said secondary piston means is interposed between said biasing means and one of said stator discs.

7. A brake according to claim 2 wherein said stator discs include a primary disc, and wherein said primary piston includes a skirt adapted to engage said primary disc.

8. A brake according to claim 2 wherein said secondary piston means includes an annular piston adapted to engage said stator discs around a circular path.

9. A brake according to claim 2 wherein said secondary piston means includes at least one spot piston for engaging a predetermined spot on said stator disc.

10. A brake according to claim 9 wherein said secondary piston means includes at least three spot pistons spaced equiangularly about the axis of said rotor shaft.

11. A brake according to claim 9 wherein said stator discs include a primary disc and a secondary disc, said secondary piston means extending through apertures in said primary disc to directly engage said secondary disc without engaging said primary disc, action of the secondary piston means thereby permitting braking action to occur without disturbing said primary piston means when said spot pistons are hydraulically energized.

12. A brake comprising a rotor shaft, rotor discs mounted upon the rotor shaft, stator discs interleaved with the rotor discs, torque pins attached to the peripheries of said stator discs to prevent rotation of said stator discs but permitting axial sliding movement thereon, biasing means normally biasing the rotor and stator discs axially into frictional interengagement to provide a brake-engaged condition, primary piston means mounted for reciprocation in the housing and hydraulically operable in opposition to said biasing means and having an annular skirt engaging one of said stator discs to shift said stator discs axially and release said frictional braking engagement, and secondary piston means including at least one piston mounted in the housing for reciprocation independently of the primary piston means and adapted to selectively engage a stator disc and selectively urge that engaged stator disc into a brake-engaged position so as to provide braking action to the rotor shaft.

13. A brake according to claim 12 wherein said secondary piston means includes an annular piston adapted to engage said stator discs around a circular path.

14. A brake according to claim 12 wherein said secondary piston means includes at least one spot piston for engaging a predetermined spot on said stator disc.

15. A fluid brake comprising a stationary housing, adapted to surround a rotor shaft rotatable in said housing, at least one rotor disc adapted to be carried on the rotor shaft for rotation therewith but the disc being adapted for axial sliding motion movement on the shaft, at least one stator disc located adjacent the rotor disc and connected to the housing for axial, non-rotational movement relative to the rotor shaft, biasing means in said housing for urging the stator disc into braking engagement with the rotor disc, a primary piston reciprocable in the housing and having an annular skirt surrounding the rotor disc and engaging the stator disc to apply a force urging the stator disc in a direction opposite to the force applied by the biasing means to release the rotor-stator braking action, and secondary piston means reciprocable in the housing but movable independently of the primary piston means for selectively opposing the primary piston action and the primary piston force so as to permit the biasing means to urge a stator disc into engagement with an adjacent rotor disc to provide the braking action.

16. A fluid power brake comprising a stationary housing, adapted to surround a rotor shaft rotatable within said housing, a plurality of rotor discs carried on the rotor shaft for rotation therewith but being adapted for axial sliding movement thereon, a plurality of stator discs interleaved with the rotor discs and connected to the housing for axial, non-rotational movement relative to the rotor shaft, biasing means in said housing for urging the stator discs in a given direction into engagement with adjacent rotor discs to provide a braking action, primary piston means reciprocable in the housing and located to engage at least one stator disc and urge the stator disc in a direction opposite to the direction in which the stator disc is urged by the biasing means, whereby to relieve the biasing and braking action on the stator discs, and secondary piston means reciprocable in the housing but movable independently of the primary piston means for selectively opposing the action of the primary piston means and primary piston force so as to permit the biasing means to urge stator discs into engagement with adjacent rotor discs to provide braking action.

17. A disc brake comprising a housing having first and second separated pressurized fluid chambers and an intervening brake disc chamber, a rotor shaft jouraled on the housing and having spaced rotor discs disposed within said brake disc chamber, coacting stator discs in the brake disc chamber in alternating relation with the rotor discs and including a pressure plate adjacent to the second pressurized fluid chamber, means anchoring the stator discs to the housing whereby the stator discs are prevented from rotating, a brake release piston in said first pressurized fluid chamber including an annular skirt portion extending into said brake disc chamber and surrounding the rotor brake discs therein, the end face of said skirt adapted to engage said pressure plate to disengage the disc brake when normal operating pressure is applied to said first pressurized fluid chamber, a brake applying piston in the second pressurized fluid chamber and adapted to engage the pressure plate and engage the disc brake by overcoming the fluid pressure on the brake release piston when controlled pressurized fluid is admitted to said second chamber, said brake disc chamber being a dry chamber, seals on said brake release and brake applying pistons preventing pressurized fluid from entering the dry chamber, and spring means associated with said brake applying piston and serving to bias the disc brake to an engaged condition.

18. A fluid brake comprising a stationary housing, a rotor shaft rotatable in said housing, at least one rotor disc carried on the rotor shaft for rotation therewith, but the disc being adapted for axial sliding motion movement on the shaft, at least one stator disc means located adjacent the rotor disc and connected to the housing for axial, non-rotational movement relative to the rotor shaft, biasing means in said housing for urging the stator disc means into braking engagement with the rotor disc, a primary piston reciprocable in the housing and having an annular skirt surrounding the rotor disc and engaging the stator disc means to apply a force against the stator disc means in a direction opposite to the force applied by the biasing means to release the rotor-stator braking action, and secondary piston means reciprocable in the housing but movable independently of the primary piston for selectively urging the stator disc means into engagement with a rotor disc to provide the braking action.

19. A disc brake comprising a housing having first and second separated pressurized fluid chambers and an intervening brake disc chamber, a rotor shaft journaled on the housing and having spaced rotor discs disposed within said brake disc chamber, coacting stator discs in the brake disc chamber in alternating relation with the rotor discs and including a pressure plate means adjacent to the second pressurized fluid chamber, means anchoring the stator discs to the housing whereby the stator discs are prevented from rotating, a brake release piston in said first pressurized fluid chamber including an annular skirt portion extending into said brake disc chamber and surrounding the rotor brake discs therein, the end face of said skirt adapted to engage said pressure plate means to disengage the disc brake when normal operating pressure is applied to said first pressurized fluid chamber, a brake applying piston in the second pressurized fluid chamber and adapted to engage the pressure plate means and engage the disc brake when controlled pressurized fluid is admitted to said second chamber, said brake disc chamber being a dry chamber, seals on said brake release and brake applying pistons preventing pressurized fluid from entering the dry chamber, and spring means associated with said brake applying piston and serving to bias the disc brake to an engaged condition.

* * * * *